(12) United States Patent
Kim et al.

(10) Patent No.: US 12,237,516 B2
(45) Date of Patent: Feb. 25, 2025

(54) CASE FOR SECONDARY BATTERY AND SECONDARY BATTERY

(71) Applicant: LG Energy Solution, Ltd., Seoul (KR)

(72) Inventors: Hyun Beom Kim, Daejeon (KR); Min Kyu Min, Daejeon (KR); Sung Yun Kwak, Daejeon (KR); Dae Wook Kim, Daejeon (KR); Jeong Min Ha, Daejeon (KR); Gi Man Kim, Daejeon (KR); Dong Yeon Kim, Daejeon (KR); Kyu Hyun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 832 days.

(21) Appl. No.: 17/424,046

(22) PCT Filed: Apr. 22, 2020

(86) PCT No.: PCT/KR2020/005284
§ 371 (c)(1),
(2) Date: Jul. 19, 2021

(87) PCT Pub. No.: WO2021/125454
PCT Pub. Date: Jun. 24, 2021

(65) Prior Publication Data
US 2022/0085439 A1    Mar. 17, 2022

(30) Foreign Application Priority Data
Dec. 17, 2019    (KR) .................. 10-2019-0169263

(51) Int. Cl.
*H01M 50/102*    (2021.01)
(52) U.S. Cl.
CPC ................. *H01M 50/102* (2021.01)

(58) Field of Classification Search
CPC .................................................. H01M 50/102
See application file for complete search history.

(56) References Cited

U.S. PATENT DOCUMENTS

| | | | |
|---|---|---|---|
| 2003/0039883 A1 | 2/2003 | Notten et al. | |
| 2009/0311592 A1* | 12/2009 | You ................. | H01M 10/0436 429/162 |

(Continued)

FOREIGN PATENT DOCUMENTS

| | | |
|---|---|---|
| CN | 209709026 U | 11/2019 |
| EP | 3561899 A1 | 10/2019 |

(Continued)

OTHER PUBLICATIONS

International Search Report for Application No. PCT/KR2020/005284 mailing Sep. 15, 2020, 2 pages.

(Continued)

*Primary Examiner* — Jane J Rhee
(74) *Attorney, Agent, or Firm* — Lerner David LLP

(57) ABSTRACT

A case for a secondary battery, in which an electrode assembly having a structure, in which electrodes and separators are alternately disposed, is accommodated, includes: a first recess part and a second recess part, each of which has a recessed shape; a circumferential part configured to surround a circumference of each of the first recess part and the second recess part when the case is unfolded; and a connection part provided between the first recess part and the second recess part to connect the first recess part to the second recess part, wherein, when the case is unfolded, the connection part has a shape that is recessed from each of the first recess part and the second recess part in one direction.

20 Claims, 10 Drawing Sheets

(56) References Cited

U.S. PATENT DOCUMENTS

| | | |
|---|---|---|
| 2011/0097615 A1 | 4/2011 | Goh et al. |
| 2012/0183825 A1 | 7/2012 | Lee et al. |
| 2013/0260214 A1 | 10/2013 | Ueda |
| 2014/0090236 A1 | 4/2014 | Goh et al. |
| 2014/0093762 A1 | 4/2014 | Goh et al. |
| 2015/0162575 A1 | 6/2015 | Son et al. |
| 2016/0043355 A1 | 2/2016 | Byun et al. |
| 2016/0141711 A1 | 5/2016 | Jung |
| 2016/0380245 A1 | 12/2016 | Kang |
| 2018/0219245 A1 | 8/2018 | Choi et al. |
| 2019/0027714 A1 | 1/2019 | Jung et al. |
| 2019/0044099 A1 | 2/2019 | Kang |
| 2019/0229301 A1* | 7/2019 | Li .................... B29C 33/42 |
| 2019/0312237 A1 | 10/2019 | Moon et al. |
| 2019/0386330 A1 | 12/2019 | Choi et al. |
| 2020/0083493 A1 | 3/2020 | Lee |
| 2020/0168852 A1 | 5/2020 | Oh et al. |
| 2020/0185668 A1 | 6/2020 | Levin |
| 2020/0365836 A1 | 11/2020 | Jung et al. |
| 2020/0403191 A1 | 12/2020 | Kang |
| 2021/0066676 A1 | 3/2021 | Jung et al. |
| 2022/0102790 A1 | 3/2022 | Jung et al. |
| 2022/0115687 A1 | 4/2022 | Choi et al. |

FOREIGN PATENT DOCUMENTS

| | | |
|---|---|---|
| EP | 3916830 A1 | 12/2021 |
| JP | H11307130 A | 11/1999 |
| JP | 2005501385 A | 1/2005 |
| JP | 2009533834 A | 9/2009 |
| JP | 2013157172 A | 8/2013 |
| JP | 5490324 B2 | 5/2014 |
| JP | 2015015245 A | 1/2015 |
| JP | 5838322 B2 | 1/2016 |
| JP | 2018527719 A | 9/2018 |
| JP | 2019500734 A | 1/2019 |
| JP | 2019537225 A | 12/2019 |
| KR | 20070102768 A | 10/2007 |
| KR | 100936411 B1 | 1/2010 |
| KR | 101049841 B1 | 7/2011 |
| KR | 101403692 B1 | 6/2014 |
| KR | 101515778 B1 | 5/2015 |
| KR | 20160019314 A | 2/2016 |
| KR | 20160059780 A | 5/2016 |
| KR | 20170002013 A | 1/2017 |
| KR | 20170012072 A | 2/2017 |
| KR | 20170058021 A | 5/2017 |
| KR | 101784739 B1 | 10/2017 |
| KR | 20180029856 A | 3/2018 |
| KR | 101914563 B1 | 11/2018 |
| KR | 20190010434 A | 1/2019 |
| KR | 20190030423 A | 3/2019 |
| KR | 20190093045 A | 8/2019 |
| KR | 20190096619 A | 8/2019 |
| TW | 200746507 A | 12/2007 |
| WO | 2007119950 A1 | 10/2007 |
| WO | 2019121332 A1 | 6/2019 |
| WO | 2020114708 A1 | 6/2020 |
| WO | 2021038545 A1 | 3/2021 |
| WO | 2021125842 A1 | 6/2021 |

OTHER PUBLICATIONS

Extended European Search Report including Written Opinion for Application No. 20904043.5 dated Feb. 22, 2022, pp. 1-7.

Search Report dated Sep. 26, 22 from Office Action for Chinese Application No. 202080009201.1 issued Oct. 8, 2022. 3 pgs.

* cited by examiner

CASE FOR SECONDARY BATTERY AND SECONDARY BATTERY

CROSS-REFERENCE TO RELATED APPLICATIONS

The present application is a national phase entry under U.S.C. § 371 of International Application No. PCT/KR2020/005284, filed on Apr. 22, 2020, published in Korean, which claims the benefit of the priority of Korean Patent Application No. 10-2019-0169263, filed on Dec. 17, 2019, both of which are hereby incorporated by reference in their entireties.

TECHNICAL FIELD

The present invention relates to a case for a secondary battery and a secondary battery, and more particularly, to a case for a secondary battery, which has a structure capable of reducing a volume occupied by the secondary battery when compared to the related art, and a secondary battery.

BACKGROUND ART

Secondary batteries that are repetitively chargeable and dischargeable may be divided into cylindrical type secondary batteries, prismatic type secondary batteries, and pouch type secondary batteries according to their manufacturing methods or structures. Among them, in general, such a pouch type secondary battery has a structure in which an electrode assembly having a structure, in which electrodes and separators are alternately disposed in a sheet-shaped pouch exterior, is accommodated.

According to the related art, in order to manufacture the pouch type secondary battery, a forming process, in which a portion of an area of a pouch having a sheet shape is pressed by an area corresponding to an area of the electrode assembly to form a cup having a recessed shape, is performed, and then, the electrode assembly is mounted in the cup formed in the pouch. Thereafter, portions of the area of the pouch are attached to each other to form a sealing part.

The sealing part formed by attaching the portions of the area of the pouch to each other is formed by attaching areas that are not pressed in the forming process. Thus, a portion of an area of the sealing part may be deviated from a width of the cup due to a stepped portion between the sealing part, on which the forming process is not performed, and the cup, on which the forming process is performed. FIG. 1 illustrates a state in which a portion of an area of a sealing part 3, which is provided in each of upper and lower portions of a pouch 2 of a pouch type secondary battery 1, which is manufactured according to the related art, is deviated by a width P from a width of a cup in which the electrode assembly is accommodated.

As described above, the protruding region may act as a cause of an increase in dead space that is not contributed in capacity of the secondary battery, resulting in causing a problem that energy density of the secondary battery is reduced.

DISCLOSURE OF THE INVENTION

Technical Problem

Therefore, an object achieved by the present invention is to remove a dead space that occurs in a sealing part of a pouch type secondary battery manufactured according to a related art to increase in energy density of a secondary battery.

Technical Solution

According to a first aspect of the present invention for achieving the above object, a case for a secondary battery, in which an electrode assembly having a structure, in which electrodes and separators are alternately disposed, is accommodated, includes: a first recess part having a recessed shape; a second recess part provided at one side of the first recess part and having a recessed shape; a circumferential part configured to surround a circumference of each of the first recess part and the second recess part when the case is unfolded; and a connection part provided between the first recess part and the second recess part to connect the first recess part to the second recess part, wherein, when the case is unfolded, the connection part has a shape that is recessed from each of the first recess part and the second recess part in one direction, and a stepped portion is provided on each of an area at which the first recess part and the connection part are connected to each other and an area at which the second recess part and the connection part are connected to each other.

According to a second aspect of the present invention for achieving the above object, a case for a secondary battery, in which an electrode assembly having a structure, in which electrodes and separators are alternately disposed, is accommodated, includes: a first recess part having a recessed shape; a second recess part provided at one side of the first recess part and having a recessed shape; a circumferential part configured to surround a circumference of each of the first recess part and the second recess part when the case is unfolded; and a connection part provided between the first recess part and the second recess part to connect the first recess part to the second recess part, wherein, when the case is unfolded, the connection part connects the first recess part to the second recess part such that no stepped portion is provided on either of an area at which the first recess part and the connection part are connected to each other and an area at which the second recess part and the connection part are connected to each other.

The circumferential part may include: a first circumferential part disposed on the circumference of the first recess part; and a second circumferential part disposed on the circumference of the second recess part.

When the case is unfolded, the first recess part and the second recess part may have respective shapes that are symmetrical to each other with respect to the connection part.

When the case is unfolded, the case may be bent in a V shape at an area at which the first circumferential part and the second circumferential part meet each other so that a recessed space defined by the first recess part and a recessed space defined by the second recess part face each other.

When the case is unfolded, each of a thickness by which the first recess part is recessed from the first circumferential part and a thickness by which the second recess part is recessed from the second circumferential part may be less than a thickness by which the connection part is recessed from each of the first recess part and the second recess part.

When the case is unfolded, each of a thickness by which the first recess part is recessed from the first circumferential part and a thickness by which the second recess part is recessed from the second circumferential part may be the same as a thickness by which the connection part is recessed from each of the first recess part and the second recess part.

When the case is unfolded, each of a thickness by which the first recess part is recessed from the first circumferential part and a thickness by which the second recess part is recessed from the second circumferential part may be greater than a thickness by which the connection part is recessed from each of the first recess part and the second recess part.

A sum of a thickness by which the first recess part is recessed from the first circumferential part and a thickness by which the second recess part is recessed from the second circumferential part may be the same as a width of the connection part.

When the case is unfolded, each of the area at which the first recess part and the connection part are connected to each other and the area at which the second recess part and the connection part are connected to each other may be provided as a curved surface.

An angle $\alpha$ defined by an inner surface of the first recess part disposed at an opposite side of the connection part and the first circumferential part, which meet each other, may be an obtuse angle.

An equation $\theta+2\alpha=360°$ may be satisfied between an angle $\theta$ defined by the first circumferential part and the second circumferential part and the angle $\alpha$.

The angle $\theta$ may have a value ranging from 80 degrees to 160 degrees.

According to a third aspect of the present invention for achieving the above object, a case for a secondary battery, in which an electrode assembly having a structure, in which electrodes and separators are alternately disposed, is accommodated, includes: a first recess part having a recessed shape; a second recess part provided at one side of the first recess part and having a recessed shape; and a circumferential part configured to surround a circumference of each of the first recess part and the second recess part when the case is unfolded, wherein the circumferential part includes: a first circumferential part disposed on the circumference of the first recess part; and a second circumferential part disposed on the circumference of the second recess part, wherein, when the case is unfolded, the case is bent in a V shape at an area at which the first circumferential part and the second circumferential part meet each other so that a recessed space defined by the first recess part and a recessed space defined by the second recess part face each other.

According to a fourth aspect of the present invention for achieving the above object, a secondary battery includes the case for the secondary battery.

Advantageous Effects

According to the present invention, the dead space occurring in the sealing part of the pouch type secondary battery manufactured according to the related art may be removed to increase energy density of the secondary battery.

MODE FOR CARRYING OUT THE INVENTION

Hereinafter, structures of a case for a secondary battery and the secondary battery according to the present invention will be described with reference to the accompanying drawings.

Case for Secondary Battery and Secondary Battery

Figure 1:
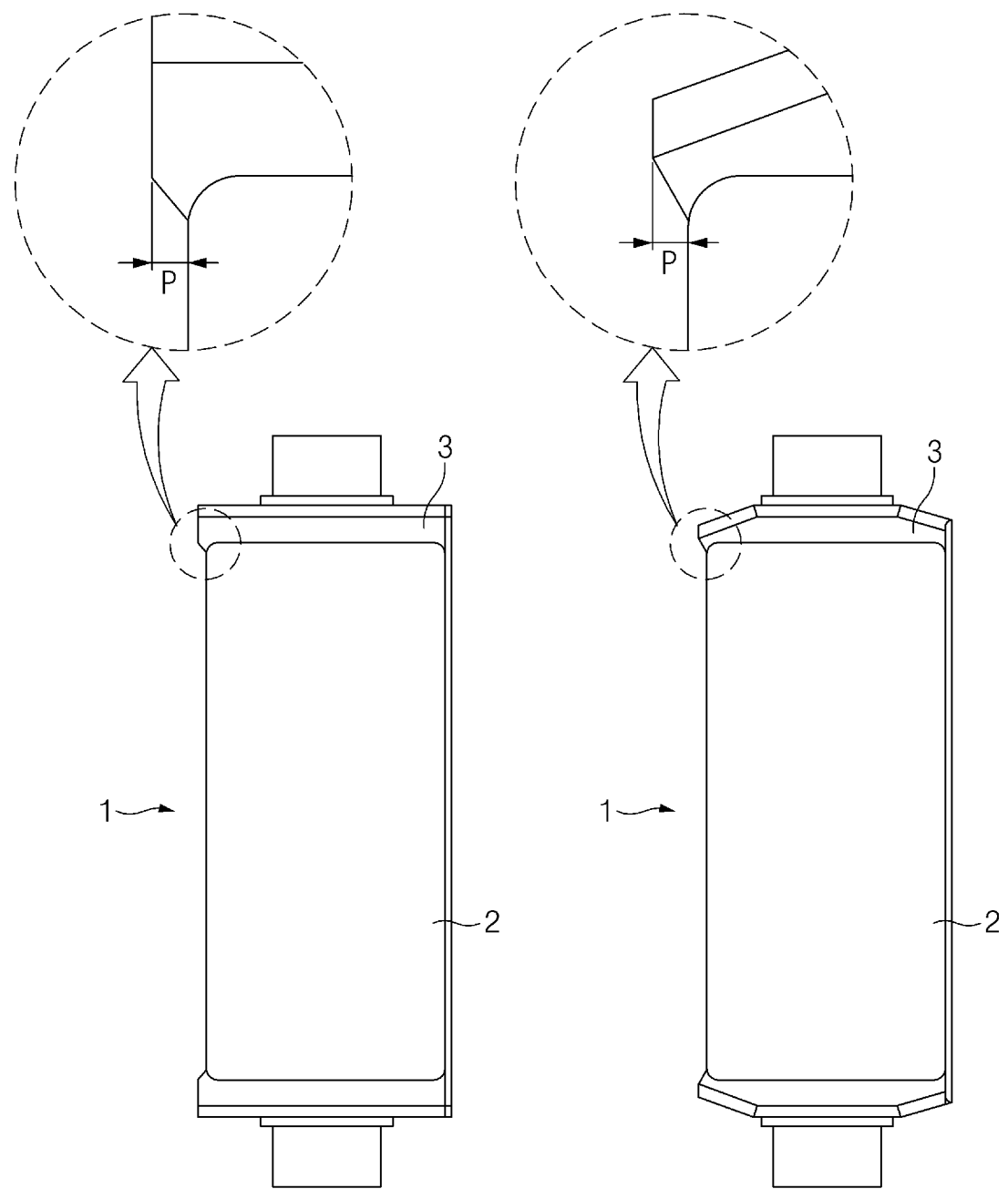
FIG. 1 is a view illustrating a structure of a secondary battery manufactured according to a related art.
Figure 2:
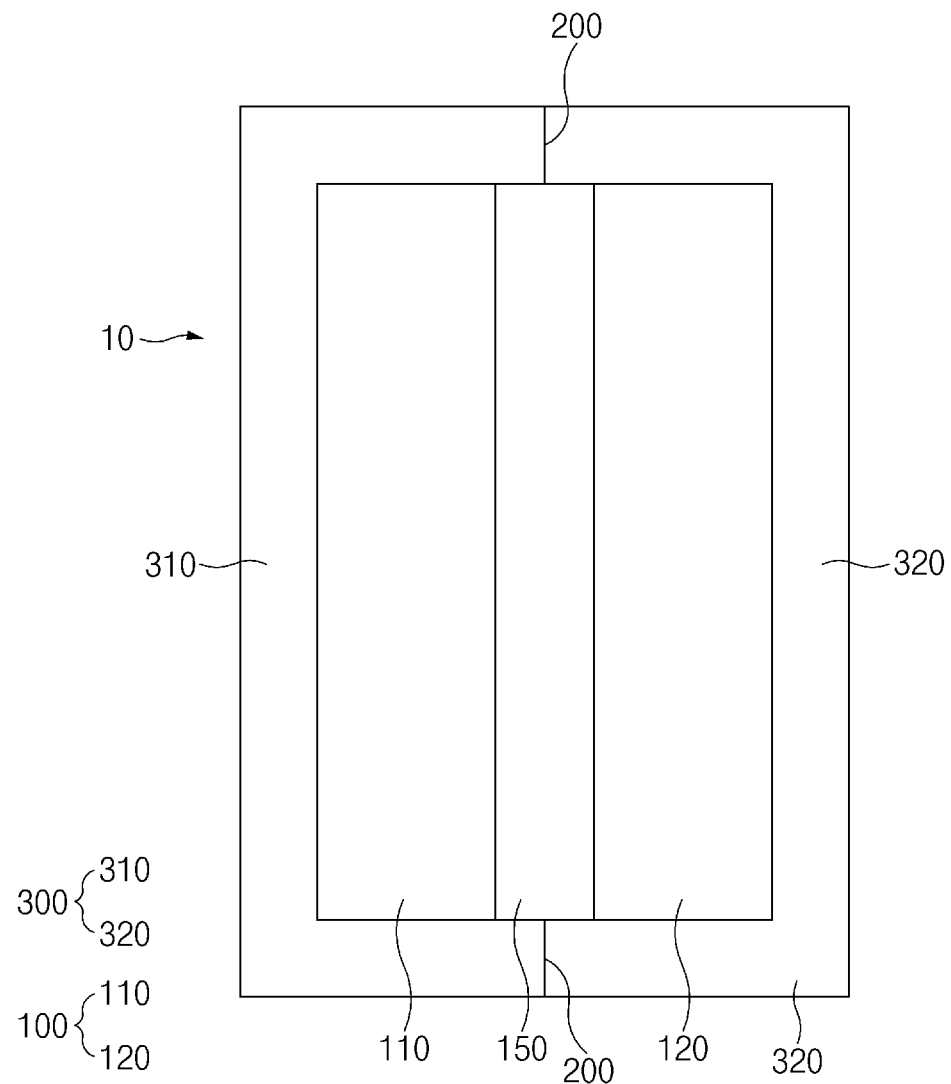
FIG. 2 is a plan view illustrating a state in which a case for a secondary battery is unfolded according to the present invention.
Figure 3:
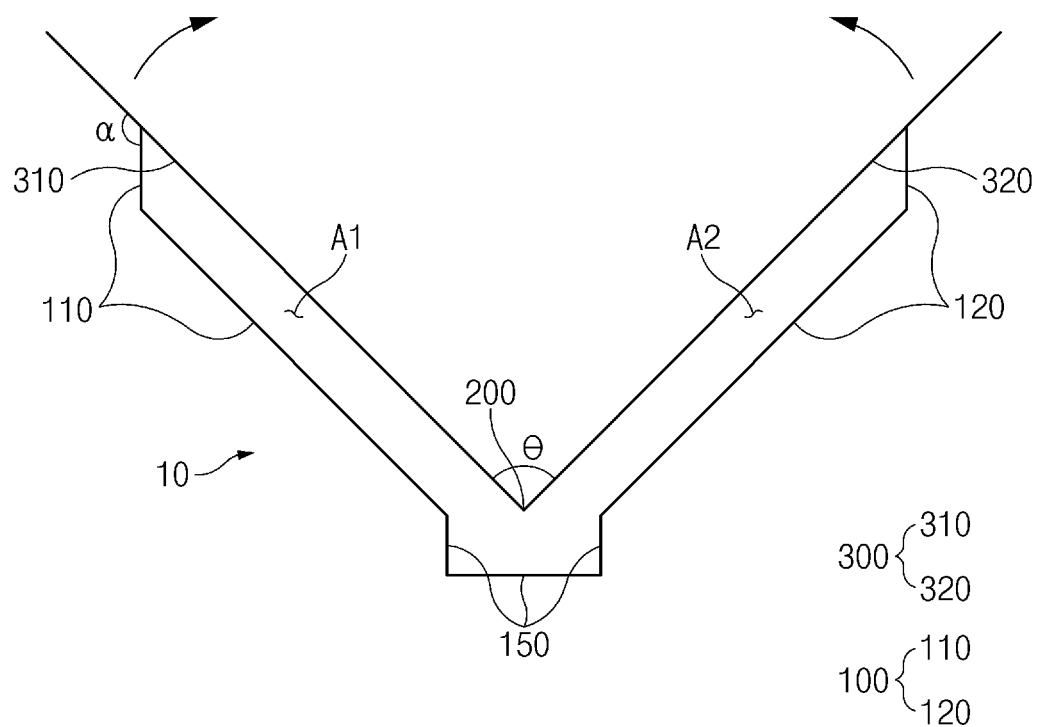
FIG. 3 is a vertical cross-sectional view illustrating a state in which the case for the secondary battery is unfolded according to an embodiment of the present invention.

FIG. 2 is a plan view illustrating a state in which a case for a secondary battery is unfolded according to the present invention, and FIG. 3 is a vertical cross-sectional view illustrating a state in which the case for the secondary battery is unfolded according to an embodiment of the present invention.

In the present specification, 'the state when the case is unfolded' may mean a state of the case when the case is unfolded by releasing predetermined bonding existing in the case, but is left without applying artificial force to the case.

A case 10 for a secondary battery (hereinafter, referred to as a 'case') according to the present invention may be configured to accommodate an electrode assembly having a structure in which electrodes and separators are alternately disposed.

Here, as illustrated in FIGS. 2 and 3, the case 10 may include a recess part 100 having a recessed shape. The recess part 100 may include a first recess part 110 and a second recess part 120 provided at one side of the first recess part 110.

As described above, the recess part 100 may have a recessed shape. Therefore, an internal space of the recess part may be defined in the recess part 100. That is, as illustrated in FIGS. 2 and 3, the case 10 may have a recessed space A1 defined by the first recess part 110 and a recessed space A2 defined by the second recess part 120.

According to the present invention, the case 10 may further include a circumferential part 300 surrounding circumferences of the first recess part 110 and the second recess part 120 when the case 10 is unfolded.

In this case, the circumferential part 300 may include a first circumferential part 310 disposed around the first recess part 110 and a second circumferential part 320 disposed around the second recess part 120. As illustrated in FIGS. 2 and 3, the first circumferential part 310 and the second circumferential part 320 may be in contact with each other.

Also, the case 10 according to the present invention may further include a connection part 150 connecting the first recess part 110 to the second recess part 120. As illustrated in FIGS. 2 and 3, the connection part 150 may be provided between the first recess part 110 and the second recess part 120. As illustrated in FIG. 3, the connection part 150 may be opened with respect to the first recess part 110 and the second recess part 120. Thus, the recessed space A1 of the first recess part 110 and the recessed space A2 of the second recess part 120 may communicate with each other by the connection part 150.

According to the present invention, when the case 10 is unfolded, the case 10 may be bent in a V shape on an area on which the first circumferential part 310 and the second circumferential part 320 meet each other. In FIG. 3, the V-shaped bent part 200 is illustrated on the area on which the first circumference 310 and the second circumferential part 320 meet each other. Thus, as illustrated in FIG. 3, when the case 10 is unfolded, the recessed space A1 defined by the first recess part 110 and the recessed space A2 defined by the second recess part 120 may face each other.

According to the related art, in order to manufacture a pouch type secondary battery, a process of folding a sheet-type exterior after pressing a portion of an area of the sheet-type exterior having a flat shape to form a recess part in the sheet-type exterior is performed.

However, according to the related art, before being folded, since the sheet-type exterior has the flat shape except for the area, in which the recess part is defined, with respect to the area to be folded, it is necessary to fold the sheet-type exterior at 180 degrees. However, in this case, since the folding angle of the sheet-type exterior is large, deformation in shape of the sheet-type exterior may increase before and after the folding process. Thus, a dead space that is not contributed to improve capacity in the secondary battery may be generated to cause a problem in which an outer appearance of the sheet-type exterior is largely deformed.

However, according to the present invention, since the area on which the sheet-type exterior (i.e., the case) is folded has the V-shape, the folding angle of the sheet-type exterior decreases in the folding process according to the related art. Thus, the deformation in shape of the sheet-type exterior before and after the folding process may be minimized. Thus, the dead space that is not distributed to improve the capacity in the secondary battery may be reduced to minimize the deformation in outer appearance, which occurs in the sheet-type exterior.

Figure 4:
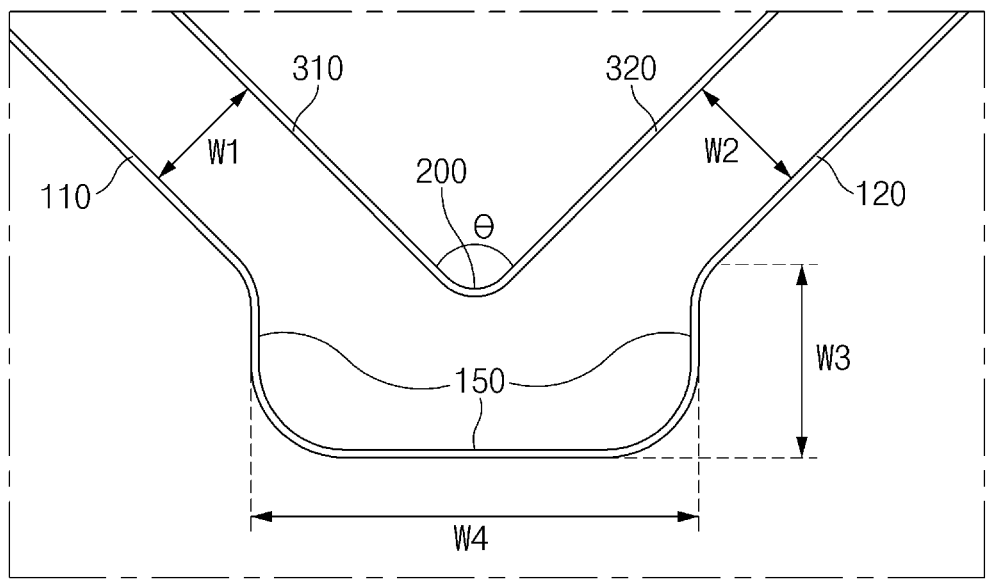
FIG. 4 is an enlarged vertical cross-sectional view illustrating a state in which a first recess part, a second recess part, and a connection part are connected in a case for a secondary battery according to a first embodiment of the present invention.
Figure 5:
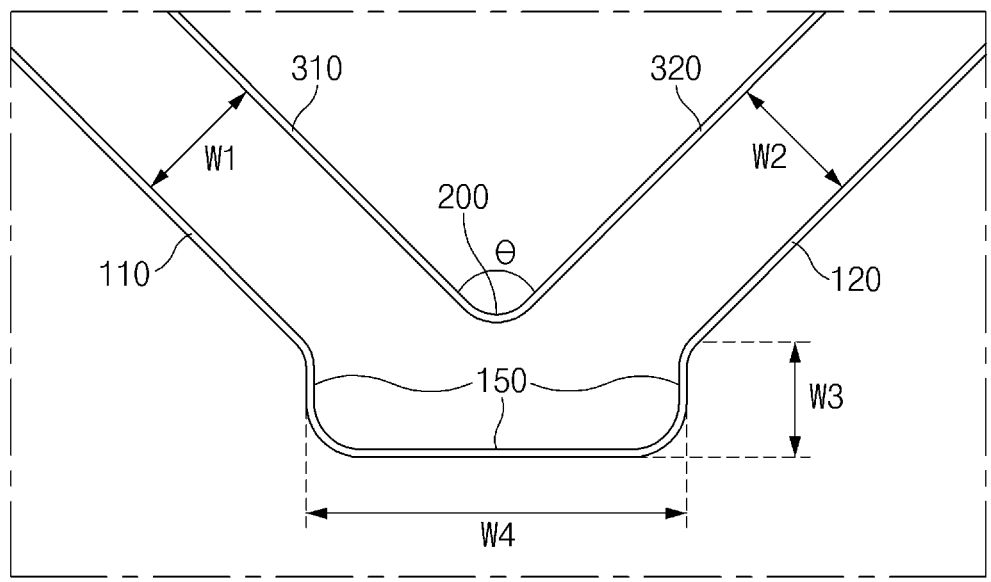
FIG. 5 is an enlarged vertical cross-sectional view illustrating a state in which a first recess part, a second recess part, and a connection part are connected in a case for a secondary battery according to a second embodiment of the present invention.
Figure 6:
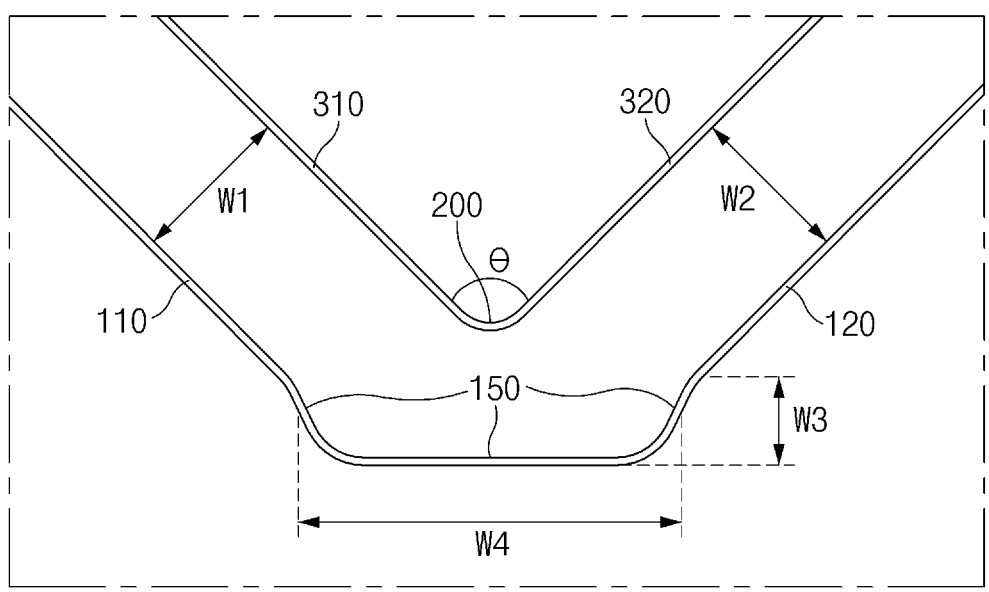
FIG. 6 is an enlarged vertical cross-sectional view illustrating a state in which a first recess part, a second recess part, and a connection part are connected in a case for a secondary battery according to a third embodiment of the present invention.

FIG. 4 is an enlarged vertical cross-sectional view illustrating a state in which a first recess part, a second recess part, and a connection part are connected in a case for a secondary battery according to a first embodiment of the present invention, and FIG. 5 is an enlarged vertical cross-sectional view illustrating a state in which a first recess part, a second recess part, and a connection part are connected in a case for a secondary battery according to a second embodiment of the present invention. Also, FIG. 6 is an enlarged vertical cross-sectional view illustrating a state in which a first recess part, a second recess part, and a connection part are connected in a case for a secondary battery according to a third embodiment of the present invention.

As described above, since the recess part 100 has the recessed shape, the first recess part 110 and the second recess part 120, which constitute the recess part 100, may be recessed by a predetermined thickness from the first circumferential part 310 and the second circumferential part 320, respectively. FIGS. 4 to 6 illustrate a state in which the first recess part 110 is recessed by a predetermined thickness W1 from the first circumferential part 310, and the second recess part 120 is recessed by a predetermined thickness W2 from the second circumferential part 320.

When the case 10 is unfolded, the first recess part 110 and the second recess part 120 have shapes that are symmetrical to each other with respect to the connection part 150. Thus, referring to FIGS. 4 to 6, the thickness W1 by which the first recess part 110 is recessed from the first circumferential part 310 may be the same as the thickness W2 by which the second recess part 120 is recessed from the second circumferential part 320. However, unlike this, the first recess part 110 and the second recess part 120 may have shapes that are asymmetrical to each other. Thus, the thickness W1 by which the first recess part 110 is recessed from the first circumferential part 310 may be different from the thickness W2 by which the second recess part 120 is recessed from the second circumferential part 320.

As illustrated in FIGS. 3 to 6, according to an embodiment of the present invention, when the case 10 is unfolded, the connection part 150 of the case 10 may have a shape that is recessed from the first recess part 110 and the second recess part 120 in one direction. For example, as illustrated in FIGS. 3 to 6, the connection part 150 may be recessed downward from the first recess part 110 and the second recess part 120. Thus, a stepped portion may be provided on each of an area on which the first recess part 110 and the connection part 150 are connected to each other and an area on which the second recess part 120 and the connection part 150 are connected to each other.

Here, referring to FIG. 4, according to a first embodiment of the present invention, when the case 10 is unfolded, each of the thickness W1 by which the first recess part 110 is recessed from the first circumferential part 310 and the thickness W2 by which the second recess part 120 is recessed from the second circumferential part 320 may be less than a thickness W3 by which the connection part 150 is recessed from each of the first recess part 110 and the second recess part 120. Also, according to the first embodiment of the present invention, when the case 10 is unfolded, an end of a lower portion of a bent part 200, which is provided as the first circumferential part 310 and the second circumferential part 320 meet each other, may be disposed below an end of each of a lower portion of the first recess part 110 and a lower portion of the second recess part 120.

Alternatively, referring to FIG. 5, according to a second embodiment of the present invention, when the case 10 is unfolded, each of the thickness W1 by which the first recess part 110 is recessed from the first circumferential part 310 and the thickness W2 by which the second recess part 120 is recessed from the second circumferential part 320 may be the same as the thickness W3 by which the connection part 150 is recessed from each of the first recess part 110 and the second recess part 120. Also, according to the second embodiment of the present invention, when the case 10 is unfolded, an end of a lower portion of a bent part 200, which is provided as the first circumferential part 310 and the second circumferential part 320 meet each other, may be disposed at the same height as an end of each of a lower portion of the first recess part 110 and a lower portion of the second recess part 120.

Alternatively, referring to FIG. 6, according to a third embodiment of the present invention, when the case 10 is unfolded, each of the thickness W1 by which the first recess part 110 is recessed from the first circumferential part 310 and the thickness W2 by which the second recess part 120 is recessed from the second circumferential part 320 may be greater than a thickness W3 by which the connection part 150 is recessed from each of the first recess part 110 and the second recess part 120. Also, according to the third embodiment of the present invention, when the case 10 is unfolded, an end of a lower portion of a bent part 200, which is provided as the first circumferential part 310 and the second circumferential part 320 meet each other, may be disposed above an end of each of a lower portion of the first recess part 110 and a lower portion of the second recess part 120.

Figure 7:
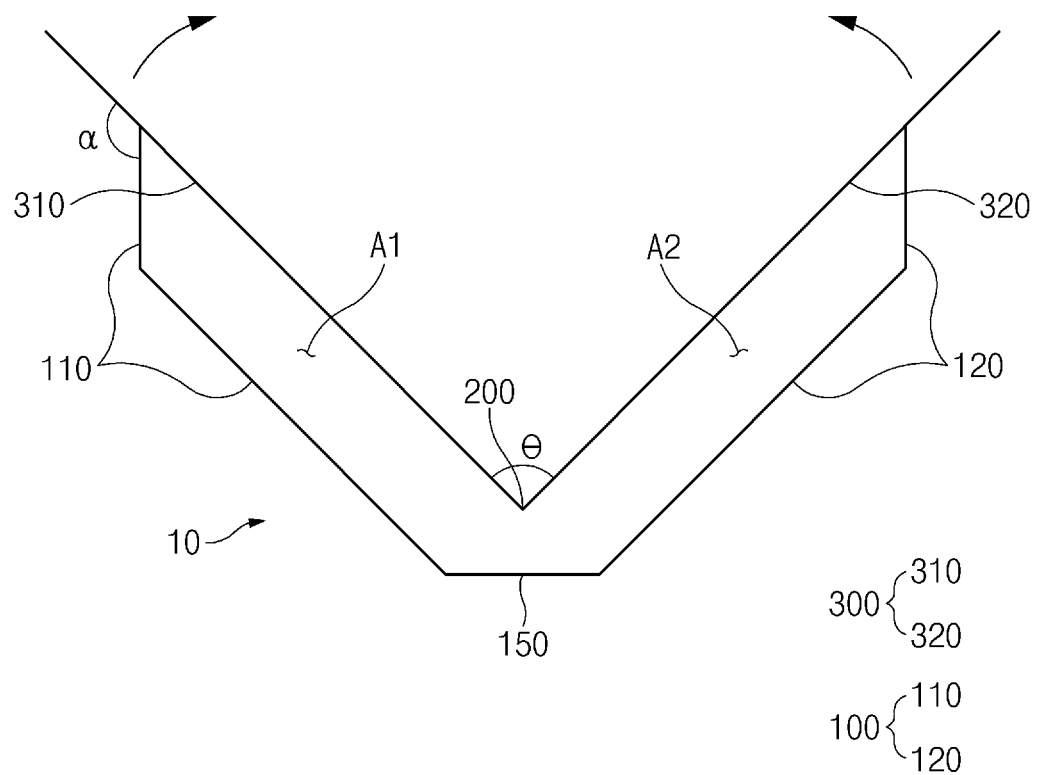
FIG. 7 is a vertical cross-sectional view illustrating a state in which a case for a secondary battery is unfolded according to another embodiment of the present invention.
Figure 8:
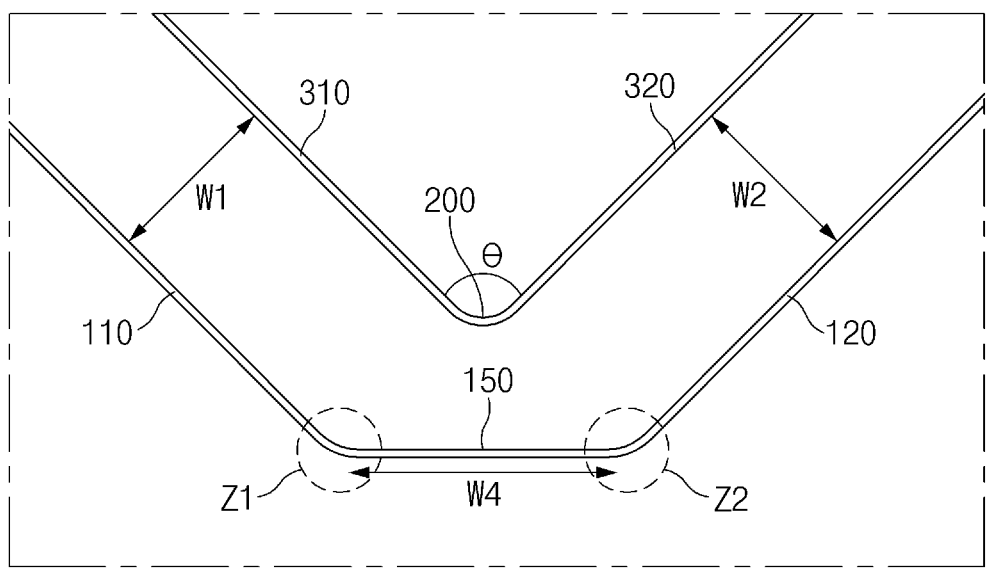
FIG. 8 is an enlarged vertical cross-sectional view illustrating a state in which a first recess part, a second recess part, and a connection part are connected in a case for a secondary battery according to a fourth embodiment of the present invention.

FIG. 7 is a vertical cross-sectional view illustrating a state in which a case for a secondary battery is unfolded according to another embodiment of the present invention, and FIG. 8 is an enlarged vertical cross-sectional view illustrating a state in which a first recess part, a second recess part, and a connection part are connected in a case for a secondary battery according to a fourth embodiment of the present invention. Hereinafter, differences from the above-described contents with respect to the case for the secondary battery according to an embodiment of the present invention or the first to third embodiments of the present invention will be mainly described.

As illustrated in FIGS. 7 and 8, according to another embodiment of the present invention, when a case 10 is unfolded, a connection part 150 may connect a first recess part 110 to a second recess part 120 so as to be flat. Thus, a stepped portion may not be provided on each of an area on which the first recess part 110 and the connection part 150 are connected to each other and an area on which the second recess part 120 and the connection part 150 are connected to each other. Here, as illustrated in FIG. 8, when the case 10 is unfolded, an area Z1 on which the first recess part 110 and the connection part 150 are connected to each other and an area Z2 on which the second recess part 120 and the connection part 150 are connected to each other may be provided as a smooth curved surface.

The above-described contents with respect to the case for the secondary battery according to an embodiment of the present invention or the first to third embodiments of the present invention may be applied as it is to the case according to the fourth embodiment within a range that is not inconsistent with the above-described contents with respect to the case according to another embodiment of the present invention or the fourth embodiment of the present invention.

Figure 9:
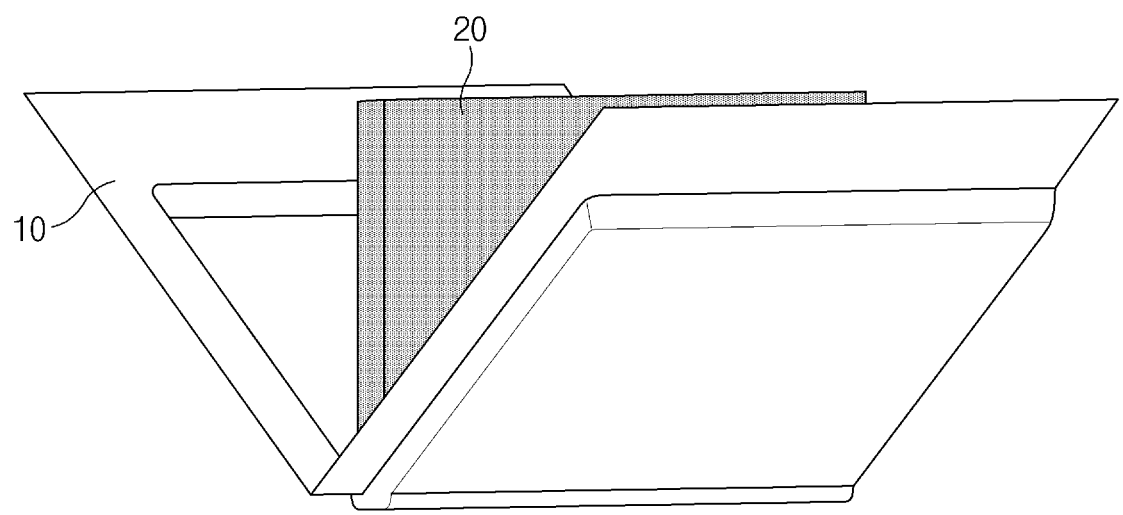
FIG. 9 is a perspective view illustrating a state in which an electrode assembly is accommodated in the case for the secondary battery according to the present invention.

FIG. 9 is a perspective view illustrating a state in which an electrode assembly is accommodated in the case for the secondary battery according to the present invention. As illustrated in FIG. 9, a first recess part 110 (see FIG. 3) and a second recess part 120 (see FIG. 3) accommodate an electrode assembly 20 in a state in which a case according to the present invention is unfolded. Thereafter, an area, on which the first recess part and a first circumferential part are disposed, and an area, on which the second recess part and a second circumferential part are disposed are identified. Then, the first circumferential part and the second circumferential part may be attached to each other to manufacture a secondary battery.

Here, as illustrated in FIG. 9, the sum of thicknesses of the first recess part and the second recess part of the case 10 may correspond to a thickness of an electrode assembly. This is because the electrode assembly is accommodated in a space defined by the first recess part and the second recess part.

Thus, referring to FIGS. 4 to 6 and 8, the sum of a thickness W1 by which the first recess part 110 is recessed from the first circumferential part 310 and a thickness W2 by which the second recess part 120 is recessed from the second circumferential part 320 may correspond to a width W4 of a connection part 150. For example, the sum of the thickness W1 by which the first recess part 110 is recessed from the first circumferential part 310 and the thickness W2 by which the second recess part 120 is recessed from the second circumferential part 320 may be the same as the width W4 of the connection part 150. In this case, when the secondary battery is manufactured using the case 10 according to the present invention, since the width of the internal space defined in the case is constant, the electrode assembly manufactured to have a predetermined width may be stably accommodated. However, unlike this, the sum of the thickness W1 by which the first recess part 110 is recessed from the first circumferential part 310 and the thickness W2 by which the second recess part 120 is recessed from the second circumferential part 320 may be less or greater than the width W4 of the connection part 150.

Referring again to FIG. 3, when the case 10 is unfolded, the case 10 according to the present invention may have a V shape on an area on which the first circumferential part 310 and the second circumferential part 320 meet each other. Thus, a bent part 200 may be provided on the area on which the first circumferential part 310 and the second circumferential part 320 meet each other, and the bent part 200 may have a predetermined angle. FIG. 3, the angle of the bent part 200 is illustrated by θ. The angle θ may have a value ranging of 80 degrees to 160 degrees.

In addition, as illustrated in FIG. 3, a predetermined angle α may be defined at an area, on which an inner surface disposed at an opposite side of the connection part 150 among inner surfaces of the first recess part 110 and the first circumferential part 310 meet each other. Here, the angle α may be an obtuse angle.

Here, the following Equation 1 may be satisfied between the angle θ and the angle α.

$$\theta + 2\alpha = 360° \qquad \text{[Equation 1]}$$

Figure 10:
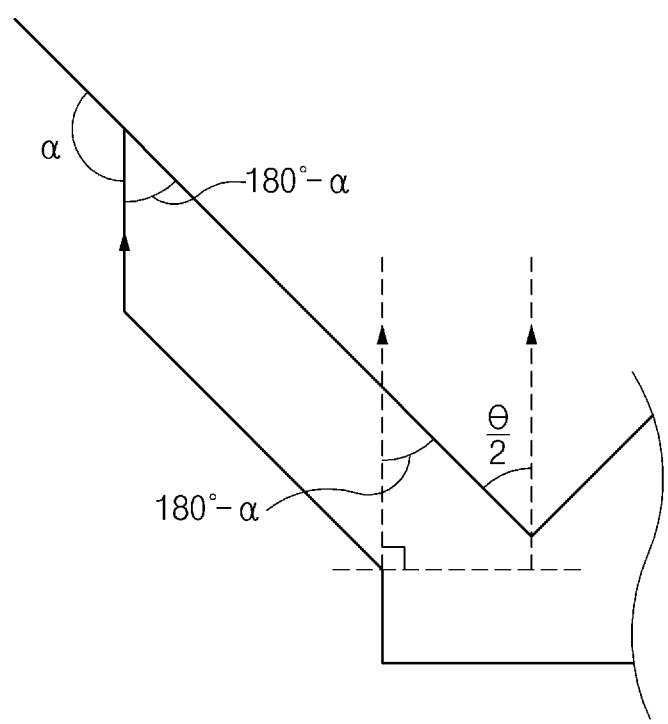
FIG. 10 is a cross-sectional view illustrating a geometrical relationship between the first recess part and the connection part of FIG. 3.

FIG. 10 is a cross-sectional view illustrating a geometrical relationship between the first recess part and the connection part of FIG. 3.

Equation 1 may be a formula that is established because of a process of manufacturing the case 10 according to the present invention.

That is, the case 10 according to the present invention may be manufactured by bending the sheet-shaped exterior into a V shape and then pressing the sheet-shaped exterior downwardly perpendicular to the ground to form the recess part.

Thus, when (i) a thickness of the first recess part is constant, (ii) the first recess part and the connection part are formed by being pressed downward perpendicular to the ground, and (iii) the first recess part and the second recess part are symmetrical to each other, as illustrated in FIG. 10, θ/2 and 180°−α may be the same, and thus, Equation 1 may be derived.

The secondary battery according to the present invention may include the electrode assembly having the structure, in which the electrodes and the separators are alternately disposed, and the case. The contents of the case are substituted with the contents described above.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A case for a secondary battery, in which an electrode assembly having a structure, in which electrodes and separators are alternately disposed, is accommodated, the case comprising:
   a first recess part having a recessed shape and extending along a first plane;
   a second recess part provided at one side of the first recess part and having a recessed shape, the second recess part extending along a second plane;
   a circumferential part configured to surround a circumference of each of the first recess part and the second recess part when the case is unfolded; and
   a connection part provided between the first recess part and the second recess part to connect the first recess part to the second recess part,
   wherein, when the case is unfolded, the connection part has a shape that is recessed from each of the first recess part and the second recess part in one direction, and a stepped portion is provided on each of an area at which the first recess part and the connection part are connected to each other and an area at which the second recess part and the connection part are connected to each other,
   wherein, when the case is unfolded with no external forces thereon, the first and second planes are angled with respect to one another to define a V-shape therebetween.

2. A case for a secondary battery, in which an electrode assembly having a structure, in which electrodes and separators are alternately disposed, is accommodated, the case comprising:
   a first recess part having a recessed shape with a base surface extending along a first plane;
   a second recess part provided at one side of the first recess part and having a recessed shape with a base surface extending along a second plane;
   a circumferential part configured to surround a circumference of each of the first recess part and the second recess part when the case is unfolded; and
   a connection part provided between the first recess part and the second recess part to connect the first recess part to the second recess part, the connection part extending along a third plane,
   wherein, when the case is unfolded, the connection part connects the first recess part to the second recess part such that no stepped portion is provided on either of an area at which the first recess part and the connection part are connected to each other and an area at which the second recess part and the connection part are connected to each other,
   wherein the base surface of the first recess part and the connection part are connected at a first bend where the first and third planes intersect, and
   wherein the base surface of the second recess part and the connection part are connected at a second bend where the second and third planes intersect.

3. The case of claim 1, wherein the circumferential part comprises:
   a first circumferential part disposed on the circumference of the first recess part; and
   a second circumferential part disposed on the circumference of the second recess part.

4. The case of claim 1, wherein, when the case is unfolded, the first recess part and the second recess part have respective shapes that are symmetrical to each other with respect to the connection part.

5. The case of claim 3, wherein, when the case is unfolded, the case is bent in a V shape at an area at which the first circumferential part and the second circumferential part meet each other so that a recessed space defined by the first recess part and a recessed space defined by the second recess part face each other.

6. The case of claim 3, wherein, when the case is unfolded, each of a thickness by which the first recess part is recessed from the first circumferential part and a thickness by which the second recess part is recessed from the second circumferential part is less than a thickness by which the connection part is recessed from each of the first recess part and the second recess part.

7. The case of claim 3, wherein, when the case is unfolded, each of a thickness by which the first recess part is recessed from the first circumferential part and a thickness by which the second recess part is recessed from the second circumferential part is the same as a thickness by which the connection part is recessed from each of the first recess part and the second recess part.

8. The case of claim 3, wherein, when the case is unfolded, each of a thickness by which the first recess part is recessed from the first circumferential part and a thickness by which the second recess part is recessed from the second circumferential part is greater than a thickness by which the connection part is recessed from each of the first recess part and the second recess part.

9. The case of claim 3, wherein a sum of a thickness by which the first recess part is recessed from the first circumferential part and a thickness by which the second recess part is recessed from the second circumferential part is the same as a width of the connection part.

10. The case of claim 2, wherein, when the case is unfolded, each of the area at which the first recess part and the connection part are connected to each other and the area at which the second recess part and the connection part are connected to each other is provided as a curved surface.

11. The case of claim 1, wherein an angle a defined by an inner surface of the first recess part disposed at an opposite side of the connection part and the first circumferential part, which meet each other, is an obtuse angle.

12. The case of claim 11, wherein $\theta+2\alpha=360°$ is satisfied between an angle $\theta$ defined by the first circumferential part and the second circumferential part and the angle $\alpha$.

13. The case of claim 12, wherein the angle $\theta$ has a value ranging from 80 degrees to 160 degrees.

14. A case for a secondary battery, in which an electrode assembly having a structure, in which electrodes and separators are alternately disposed, is accommodated, the case comprising:
   a first recess part having a recessed shape;
   a second recess part provided at one side of the first recess part and having a recessed shape; and
   a circumferential part configured to surround a circumference of each of the first recess part and the second recess part when the case is unfolded,
   wherein the circumferential part comprises:
   a first circumferential part disposed on the circumference of the first recess part and extending along a first plane; and a second circumferential part disposed on the circumference of the second recess part and extending along a second plane, wherein, when the case is unfolded with no external forces thereon, the first and second planes are angled with respect to one another such that the case is in a bent state defining a V shape at an area at which the first circumferential part and the second circumferential part meet each other so that a recessed space defined by the first recess part and a recessed space defined by the second recess part face each other.

15. A secondary battery comprising:

an electrode assembly having a structure in which electrodes and separators are alternately disposed; and the case of claim 1.

16. A secondary battery comprising:

an electrode assembly having a structure in which electrodes and separators are alternately disposed; and the case of claim 2.

17. The case of claim 1, wherein the circumferential part comprises:

a first circumferential part disposed on the circumference of the first recess part; and a second circumferential part disposed on the circumference of the second recess part.

18. The case of claim 17, wherein, when the case is unfolded, the case is bent in a V shape at an area at which the first circumferential part and the second circumferential part meet each other so that a recessed space defined by the first recess part and a recessed space defined by the second recess part face each other.

19. The case of claim 17, wherein, when the case is unfolded, each of a thickness by which the first recess part is recessed from the first circumferential part and a thickness by which the second recess part is recessed from the second circumferential part is less than a thickness by which the connection part is recessed from each of the first recess part and the second recess part.

20. The case of claim 17, wherein, when the case is unfolded, each of a thickness by which the first recess part is recessed from the first circumferential part and a thickness by which the second recess part is recessed from the second circumferential part is the same as a thickness by which the connection part is recessed from each of the first recess part and the second recess part.

* * * * *